Patented Feb. 4, 1936

2,030,002

UNITED STATES PATENT OFFICE

2,030,002

CEMENT

Arnold Hermann, Sharpsburg, Pa.

No Drawing. Application December 18, 1934, Serial No. 758,096

1 Claim. (Cl. 106—29)

This invention relates to cement.

The cement of my invention is of general applicability and is particularly useful in cementing glass, pottery, iron, wood, steel, concrete, etc., and may also be used for cementing linoleum to the floor.

As an example of the preparation of the novel cement, a dry mixture may be made comprising two kilograms of powdered white calcined magnesium carbonate, that is, magnesium oxide, two kilograms of powdered barium sulphate and one kilogram of chalk, preferably precipitated chalk. A liquid mixture may then be made using three liters of an aqueous solution of magnesium chloride having a density of 27° Bé. one liter of sulphuric acid, 22° Bé., and one liter of muriatic acid, 21° Bé. Five parts by volume of the mentioned dry mixture are then combined with two parts by volume of the mentioned liquid mixture, preferably on a wooden surface or in a wooden receptacle. The mixture or combining of the dry and liquid mixtures is preferably done quickly to avoid hardening of the cement, and just prior to the time of using it; if hardening occurs however the addition of some more of the liquid mixture will render it soft again.

Another composition which I have found to be a very desirable cement may be made by making a dry mixture of forty grams of powdered white calcined magnesium carbonate, or magnesium oxide, forty grams of powdered lead chloride, and eleven grams of chalk, preferably precipitated chalk, and then combining this dry mixture with a liquid mixture made with one hundred centiliters of an aqueous solution of magnesium chloride having a gravity of 26° Bé., and ten centiliters of muriatic acid of 21° Bé., five parts by volume dry mixture being combined with one part of liquid mixture.

The composition last described may be colored if desired, preferably by mixing therewith a mineral color or colors and the composition may then be used to imitate the inlaid work of colored marble. This cement, which, like the cement first described, should be made just prior to use as a cement, has, like the cement first described, many excellent qualities, such for example as resistance to weathering or atmospheric conditions.

What is claimed as new is:

The process of producing cement comprising first forming a dry mixture of two kilograms of magnesium oxide, two kilograms of barium sulfate, and one kilogram of chalk, then forming a liquid mixture of three liters of an aqueous solution of magnesium chloride having a density of 27° Bé., one liter of sulphuric acid 22° Bé., one liter of muriatic acid 21° Bé., and combining five parts by volume of the dry mixture with two parts by volume of the liquid mixture.

ARNOLD HERMANN.